United States Patent [19]
Clark et al.

[11] 3,782,036
[45] Jan. 1, 1974

[54] DOORS FOR VEHICLES

[75] Inventors: George William Joseph Clark, Bayston Hill, near Shrewsbury; Gerald William Golder, Wellington; Frederick Leslie Hart, Cressage, all of England

[73] Assignee: GKN Sankey Limited, Bilston, Staffordshire, England

[22] Filed: Aug. 17, 1972

[21] Appl. No.: 281,518

[30] Foreign Application Priority Data
Aug. 21, 1971 Great Britain.................. 39,314/71
Aug. 21, 1971 Great Britain.................. 39,315/71

[52] U.S. Cl. ................................................. 49/502
[51] Int. Cl. ............................................... B60j 5/04
[58] Field of Search ................... 49/501, 502, 503, 49/166, 507, 506; 296/146

[56] References Cited
UNITED STATES PATENTS
3,370,384  2/1968  Hafer et al............................. 49/502
3,258,877  7/1966  Peras .................................... 49/502
3,250,041  5/1966  Anger ................................... 49/501
2,760,814  8/1956  Watter................................... 49/502
2,650,857  9/1953  Watter et al.......................... 49/502
1,701,574  2/1929  Ledwinka .......................... 49/503 X

FOREIGN PATENTS OR APPLICATIONS
518,248  11/1955  Canada............................... 49/502

*Primary Examiner*—Kenneth Downey
*Attorney*—Charles J. Merriam et al.

[57] ABSTRACT

The specification discloses a vehicle door body of plastics material comprising an outer skin and an inner panel releasably secured together. A Y-shaped metal reinforcement is interposed between the skin and the panel and provides anchorages for the door hinges and lock and latch mechanism. The reinforcement is adjustably fixed to the outer panel so that the latter can be adjusted in position in a door aperture relative to the hinges. A vehicle body shell with the outer skins secured thereto is painted and then the inner panels carrying the door mechanisms are secured to the outer skins.

8 Claims, 9 Drawing Figures

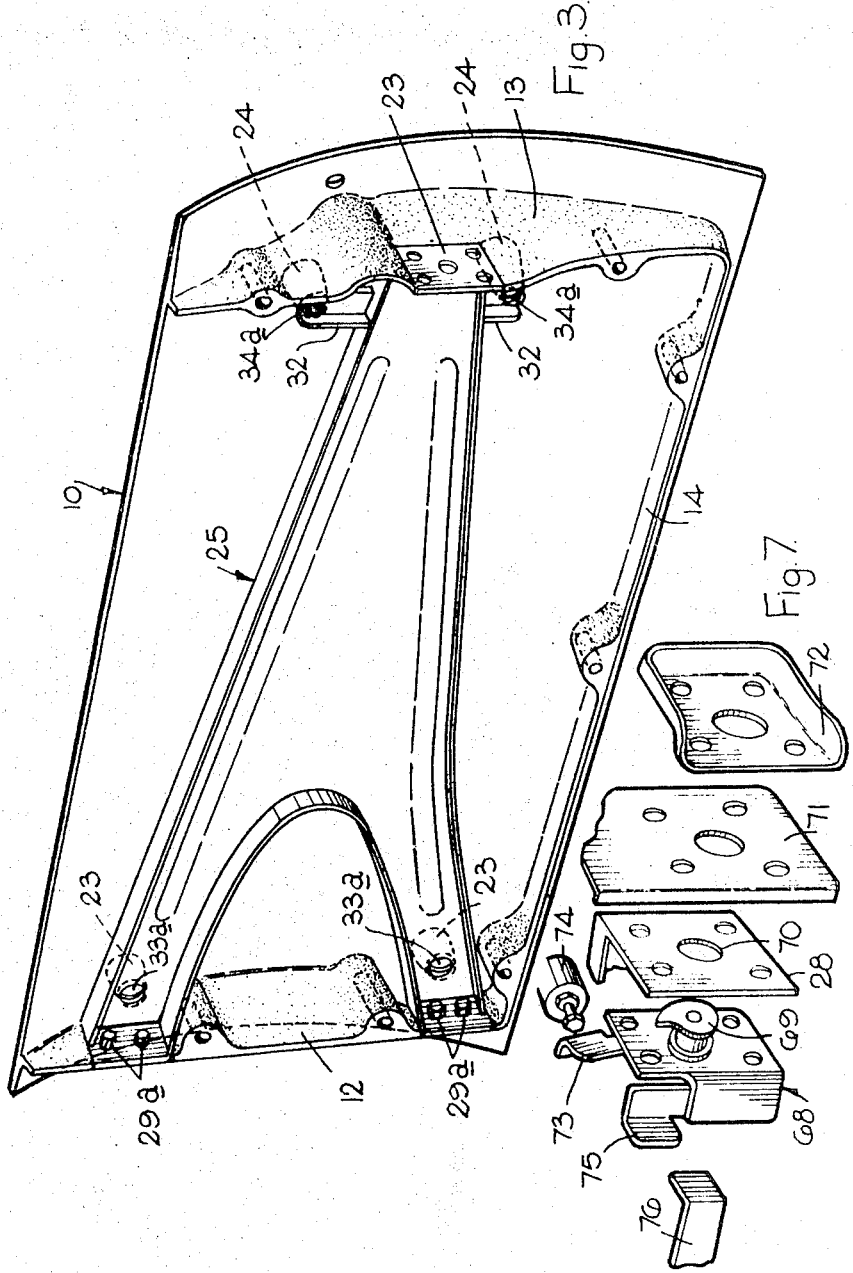

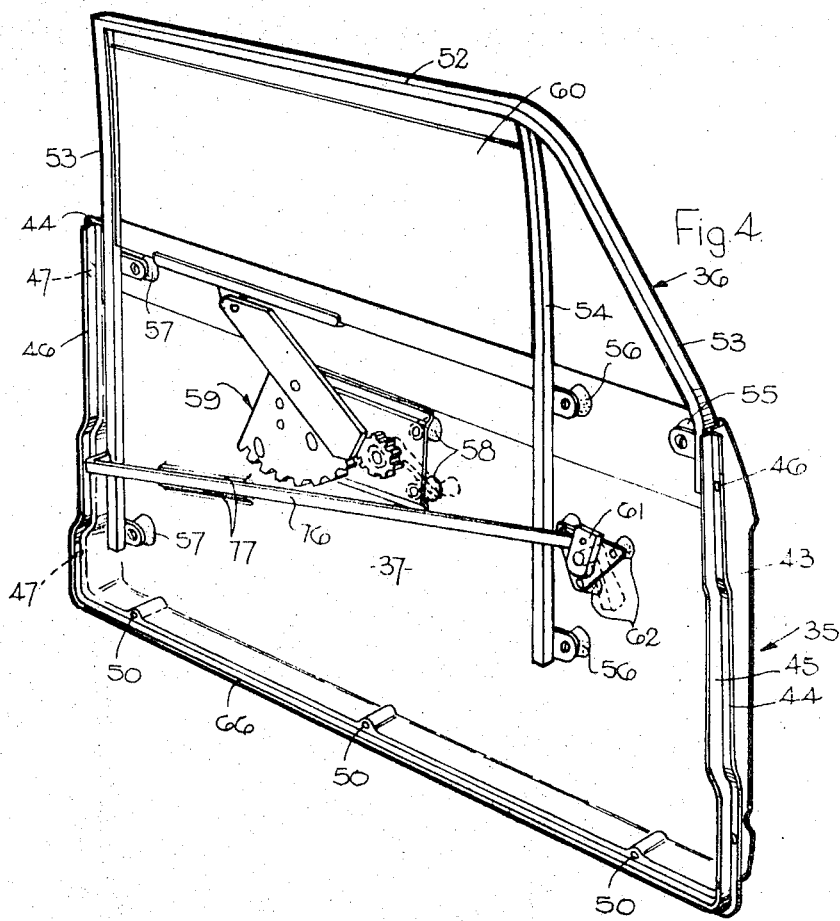
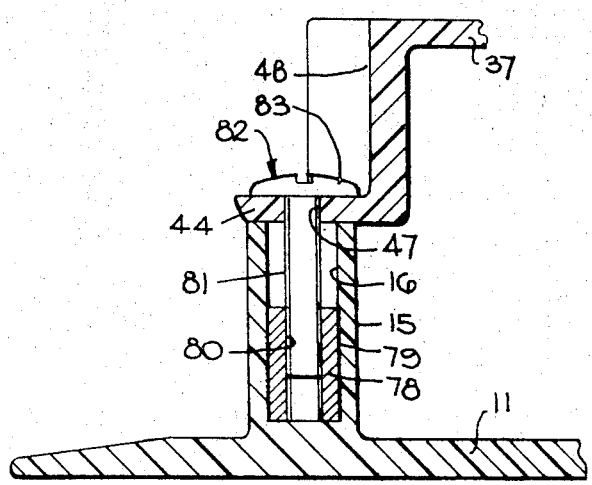

DOORS FOR VEHICLES

BACKGROUND OF THE INVENTION

1. Field of the Invention

This invention relates to doors for vehicles and particularly to doors for private passenger cars although also applicable to doors for the cabs of commercial and other vehicles. The invention is also concenred with the manufacture of a car or cab body in so far as the manufacture includes mounting of the doors and painting the body.

2. Description of the Prior Art

A common practice in the making of motor car doors of sheet metal is to use three components, an outer skin, an inner panel and an upper frame member. The outer sheet metal skin is contoured to blend with the external shape of the body and its inner surface is free of any attachments such as brackets or bosses since the fixing of these to the metal skin e.g., by welding, would cause deformation thereof which would be apparent from the exterior of the door and would make the latter of unacceptable appearance. The inner panel is a complex member formed by deep drawing and piercing sheet metal and is secured to the outer skin by folding marginal edges of the latter over corresponding marginal edges of the inner panel and clenching and if desired spot welding.

Since for the foregoing reason it is not acceptable to have any attachment points on the outer skin the inner panel carries the door hinges and all the door mechanism i.e., the window and its winding mechanism and the locking and latching mechanism and the controls therefor and has to be shaped and apertured to receive these items and to enable them to be fixed to the panel after the latter has been secured to the outer skin.

The upper frame is of inverted U-shape and provides a surround for the door window and is either riveted, brazed or welded to the previously assembled outer skin and inner panel. In some constructions the upper frame is integral with the outer skin or inntter panel or is formed of two parts one of which is integral with the outer skin and the other of which is integral with the inner panel.

In order to obtain consistency in paint colour it is necessary, when making a motor car body, that all the major parts of the body are painted simultaneously and therefore the doors are attached to the body before it is painted. Since in conventional constructions the inner panel carries the hinges whereby the door is fixed to the body each door must, when the body is painted, be in the form of the assembled inner panel and outer skin with the upper frame member if this is a separate item. On the other hand, the various door mechanisms to be carried by the inner panel cannot be assembled thereto before the door is painted otherwise the mechanisms will become clogged with paint and inoperative.

It follows that after painting of the body including the doors the various mechanisms must be assembled in each door between the inner panel and the outer skin thereof and this is difficult and takes a comparatively long time because of the restricted access available to the space between the outer skin and the inner panel. It is also necessary to apply the normal weather stripping and any brightwork to the doors after painting.

It is an object of one aspect of the invention to provide an improved vehicle door which simplifies vehicle manufacture.

SUMMARY OF THE INVENTION

According to the invention we provide a vehicle door comprising an outer skin of plastics material;
first fixing elements projecting from the inner surface of the skin;
an inner panel of plastics material; releasable securing means holding the skin and the panel in assembled relation;
a Y-shaped metal reinforcing member interposed between the panel and the skin and extending between the front and rear edges of the door with the end of the stem of the Y providing an anchorage for the door latch mechanism and the ends of the bifurcations of the Y providing anchorages for the door hinges;
and second fixing elements engaging the reinforcing member and the first fixing elements rigidly to secure the reinforcing member to the skin,
the fixing elements and the reinforcing member being arranged to permit of adjustment of the relative positions of the skin and the reinforcing member before the two are rigidly secured together.

Such a door has the following advantages:

1. It meets both the anti-burst requirements and the side reinforcement requirements of recent legislation in respect of safety in motor vehicles.

2. Since the reinforcing member is secured to the outer skin such member can carry the hinges and the outer skin can be painted with the car body without the inner panel in position as will be described below. The inner panel can then have the door mechanisms assembled thereto before fixing to the outer skin.

3. The outer skin can be adjusted relative to the hinges to be properly positioned in the door aperture before being rigidly secured to the reinforcing member.

4. The releasable nature of the connection between the outer skin and inner panel facilitates servicing of the door mechanisms and also the replacement of damaged door parts. Thus in case of an accident it may only be necessary to replace the outer skin while using the original inner panel and mechanisms.

By door mechanisms we mean the door window and window winding mechanism with its winding handle and the door latch and lock and the controls therefor but not necessarily the inner and outer door handles.

Preferably, substantially all the door mechanisms are mounted on the inner panel before the latter is secured to the outer skin. Normally it will not be possible to assemble all the mechanisms to the inner panel because for example there may be parts of the lock and latch which have to be mounted on the outer skin.

Preferably, said anchorages are exposed and not covered by plastics material so that the hinges and the latch mechanisms are connectable directly yo the anchorages. This construction is preferred so that there is no plastic material between the anchorages on the one hand and the hinges or the latch on the other hand thus avoiding the fretting of plastic material which has, heretofore, been one of the problems encountered in making doors of plastics material.

In a preferred construction, the first fixing elements comprise bosses arranged to receive bolts or screws forming the second fixing elements and oversize holes are provided in the reinforcing member to permit said adjustment of the relative positions of the outer skin and the reinforcing member.

The releasable securing means for the skin and panel are conveniently arranged around the sides and bottoms of the outer skin and inner panel thus leaving a clear space for the window glass and mechanism and not obstructing the vertical movement of the window. Any convenient form of releasable securing means may be used.

The inner panel may itself provide the interior trim to the door in which case the interior handles may be mounted on the panel before the latter is secured to the outer skin. If an additional trim panel is to be used then this panel and the interior handles will be added after the inner panel has been secured to the outer skin. In either event, if the inner panel is made continuous the present practice of including a sheet of impervious plastics material, e.g., thin transparent polythene, between the inner panel and the trim panel may be dispensed with.

If desired, arm rests may be moulded integrally with the inner panel or may be fixed thereto before the inner panel is assembled with the outer skin.

Where the upper frame is a separate member, as is preferred, such member is secured to the inner panel on the bench simultaneously with, or before, assembly of the door mechanisms to the inner panel and is thus incorporated in the door when the inner panel is secured to the outer skin. The upper frame can be made from mild steel or stainless steel riveted or screwed to the inner panel. Any brightwork on the mild steel upper frame can be added on the bench before the inner panel is secured to the outer skin.

Weather strip can be applied to the inner panel and upper frame when on the bench and before being assembled to the outer skin. The inner panel may have a recess around it to receive the weather strip and this recess can be of channel shape, one wall of the channel being lower than the other and engaged in a groove on the weather strip.

It is an object of another aspect of the invention to provide an improved method of manufacturing a vehicle body.

According to this aspect of the invention we provide a method of manufacturing a vehicle body including a body sheel and a door embodying the first aspect of the invention comprising the steps of:

1. securing hinges to the body shell and to the reinforcing member;
2. applying the outer skin to the reinforcing member;
3. adjusting the position of the outer skin relative to the body shell and fixing the outer skin to the reinforcing member in said adjusted position;
4. simultaneously painting the exterior of the body shell and of said outer skin; and then
5. securing the inner panel to the outer skin after having mounted the door mechanisms on the inner panel.

This method has the advantage that all the external parts of the body can be painted simultaneously thus giving the desired consistency of colour and then the door mechanisms can be added with the inner panel.

Preferably the reinforcing member is secured to said body shell by means of the hinges before the outer skin is applied to the reinforcing member.

BRIEF DESCRIPTION OF THE DRAWINGS

The invention will now be described in detail by way of example with reference to the accompanying drawings in which:

FIG. 3 is a perspective view of an assembly of the outer skin and reinforcing member of FIGS. 1 and 2;

FIG. 4 is a perspective view of an inner panel of a door embodying the invention showing the upper frame and door mechanisms secured thereto, the view being taken from the outside of the door;

FIG. 7 is an exploded perspective view showing how the door lock arrangement may be mounted on the reinforcing member;

FIG. 8 is a section through part of the connected together inner panel and outer skin showing the releasable means for securing the inner panel to the outer skin.

DESCRIPTION OF THE PREFERRED EMBODIMENT

Figure 1:
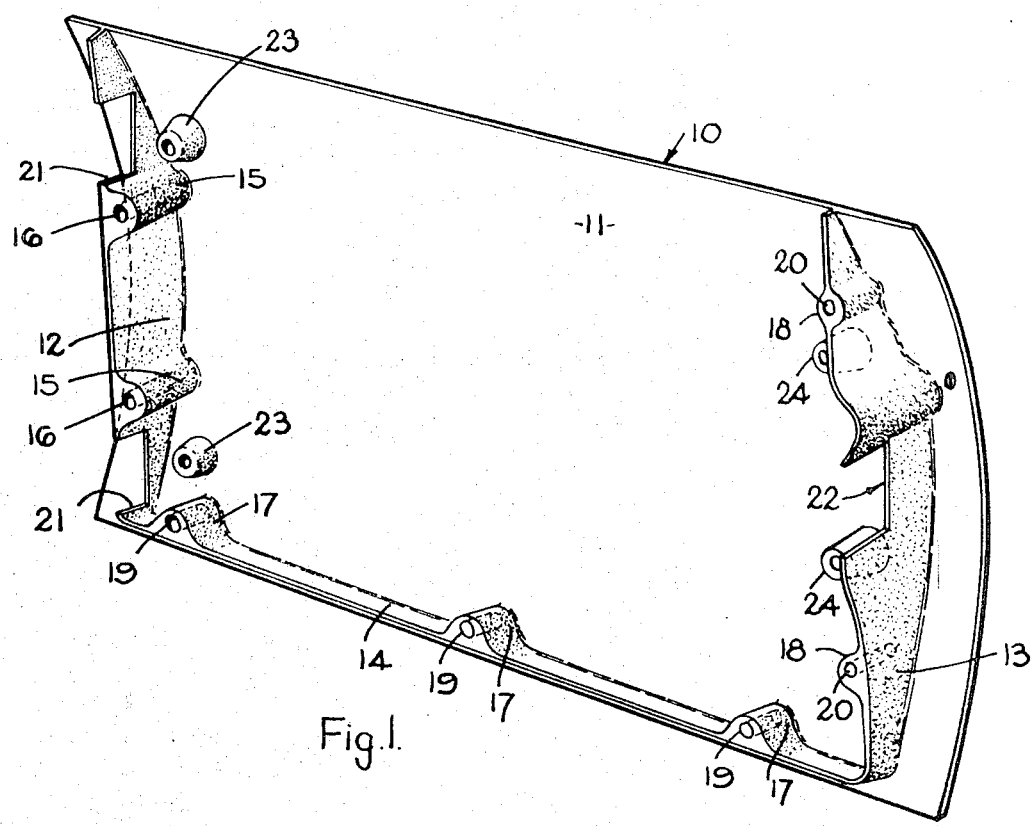
FIG. 1 is a perspective view of an outer skin of a door embodying the invention.

Referring first to FIG. 1, this shows an outer skin for a door, the skin being indicated generally at 10 and being formed of a fibre-reinforced plastics material, for example glass-reinforced polyester resin. The skin is formed by compression moulding and comprises a main panel 11 whose outer surface, not shown, is contoured to blend with the remainder of the car body. On the inner surface of the panel 11 are provided side flanges 12 and 13 and a bottom flange 14 which extends between the flanges 12 and 13 and is continuous therewith. Formed in the side flange 12 are bosses 15 in which are formed pockets 16. Similar bosses 17 are formed in the bottom flange 14 and bosses 18 are formed in the side flange 13; the bosses 17 and 18 present pockets 19 and 20 respectively. In the pockets 16, 19 and 20 are fixed internally screw-threaded cylindrical inserts not shown in FIG. 1 but described with reference to FIG. 8.

The side flange 12 has two recesses 21 therein at positions to be occupied by the hinges for the door as will hereinafter be described. The side flange 13 has a recess 22 therein at a position to be occupied by the lock and latch mechanism of the door as will hereinafter be described. The inner surface of the panel 11 carries four further bosses constituting first fixing elements, two of the bosses being indicated at 23 adjacent to the side flange 12 and two of the bosses being indicated at 24 which are adjacent to the side flange 13. The bosses are provided with pockets which receive internally threaded inserts as described above in relation to the pockets 16, 19 and 20. It will be seen that the flanges 12, 13 and 14 are inset from the side and bottom edges of the panel 11.

Figure 2:
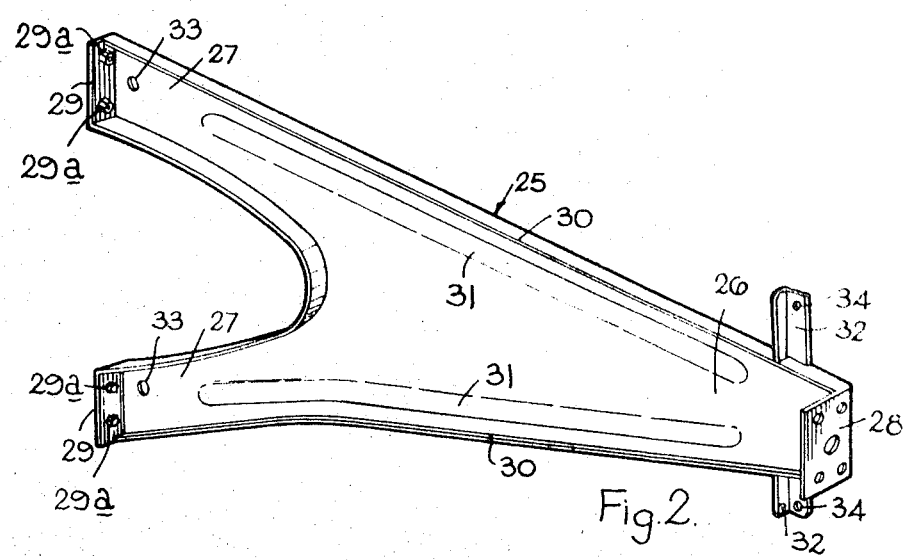
FIG. 2 is a perspective view of a reinforcing member of a door embodying the invention.

Turning now to FIG. 2, this shows a reinforcing member for the door, the reinforcing member being indicated generally at 25. The reinforcing member is of generally Y shape having a stem 26 and bifurcations or limbs 27. At the free end of the stem 26 is an apertured flange 28 and at the free end of the limbs 27 are apertured flanges 29 which carry weld nuts 29a aligned with the apertures. The member is provided with edge flanges 30 and with corrugations 31 to provide stiffness. Adjacent to the flange 28 two apertured brackets 32 of angle section are welded to the reinforcing member.

The reinforcing member 25 is secured to the outer skin 10 to form the sub-assembly shown in FIG. 4 by passing screws or bolts 33a through apertures 33 in the limbs 27 to engage the inserts in the pockets in the bosses 23 and by passing screws or bolts 34a through the apertures 34 in the brackets 32 to engage the insets in the pockets in the bosses 24. When the reinforcing member 25 is assembled to the outer skin 10 the flanges 29 are positioned in the recesses 21 in the side flange 12 of the skin and the flange 28 is positioned in the recess 22 in the side flange 13 of the skin. Hinges, not shown in FIG. 3, may be secured to the flanges 29 by hinge bolts engaging the weld nuts 29a and a lock and latch mechanism is secured to the flange 28 as will be described below. The apertures 33 and 24 are made slightly oversize for the screws or bolts 33a and 34a they receive so that there is some provision for adjustment in relative position between the reinforcing member 25 and the skin 10.

Figure 5:
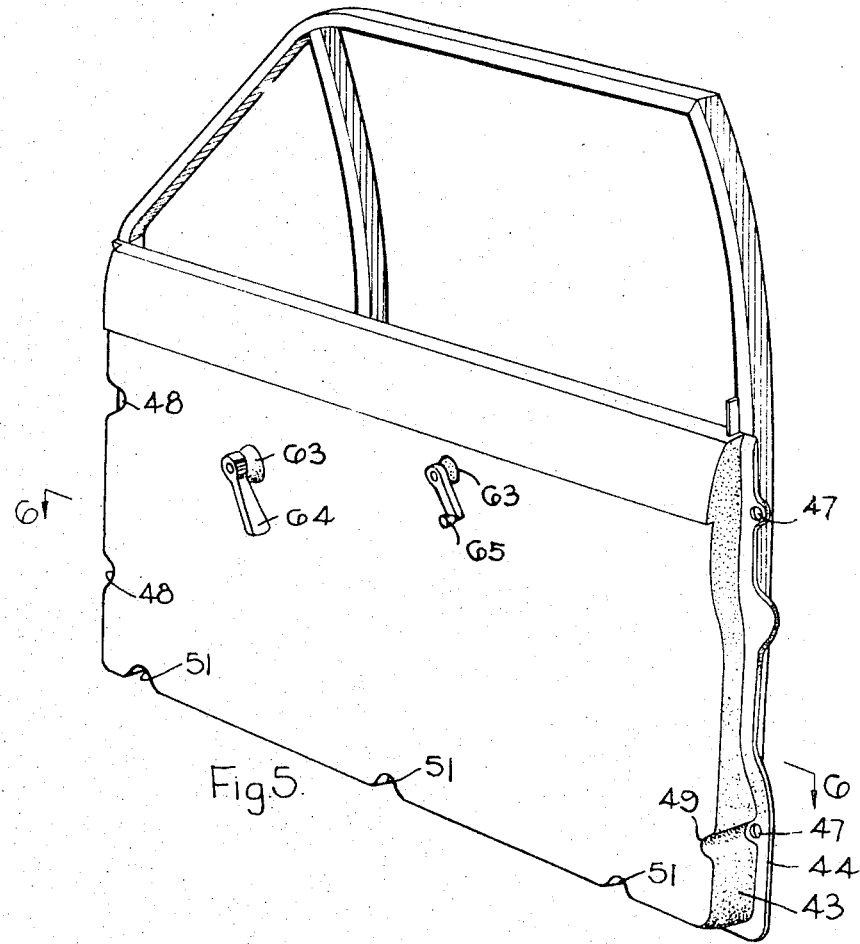
FIG. 5 is a perspective fiew of the inner panel of FIG. 4, the view being taken from the inside of the door.
Figure 6:
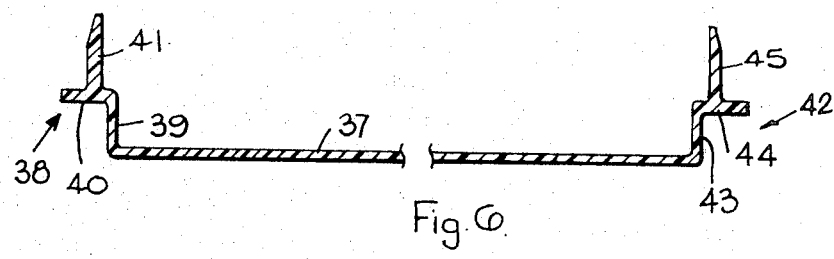
FIG. 6 is a section on the line 6—6 of FIG. 5.

Referring now to FIGS. 4, 5 and 6 these show an inner panel indicated generally at 35 and an upper frame indicated at 36 which is secured to the inner panel. The inner panel is formed as a compression moulding from a fibre-reinforced plastics material for example a glass-reinforced polyester resin. The inner panel comprises a main panel part 37 which is provided at its sides and lower edges with generall Z-shaped flanges shown in FIG. 6. Thus at the forward end of the door there is a flange indicated generally at 38 and which provides a first flange 39 generally perpendicular to the panel part 37, a second flange 40 generally parallel to the panel part 37 and the third flange 41 generally parallel to the flange 39. In a similar manner, at the rear edge of the door there is a flange indicated generally at 42 and comprising a first flange 43 generally perpendicular to the panel part 37, a second flange 44 generally parallel to the panel part 37, and a third flange 45 generally parallel to the first flange 43. Formed in the flanges 40 and 44 respectively are apertures 46 and 47 and to give clearance to the apertures 46 there are formed recesses 48 in the flange 39 and to give clearance to the lower aperture 47 there is formed a recess 49 in the flange 43. The flange shape along the lower edge of the inner panel 35 is similar and provides apertures 50 aligned with recesses 51.

The upper frame 36 comprises a member of generally inverted U shape having a base 52 and limbs 53 with a central member 54 The lower end of the forward limb 53 is secured to a threaded insert, not shown, in a boss 55 formed on the outer surface of the panel part 37 while the central member 54 is secured to threaded inserts in bosses 56 formed on the outer surface of the panel part 37. The rear limb 53 extends downwardly towards the bottom of the door and is secured to threaded inserts, not shown, in bosses 57 formed on the outer surface of the inner panel.

Bosses indicated at 58 are formed on the outer surface of the inner panel and carry threaded inserts which receive fastenings which secure the window winding mechanism 59 to the inner panel, the window being indicated at 60. The remote control 61 for the lock and latch is secured to inserts in bosses 62 on the outer surface of the panel. On the inner surface of the inner panel part 37 are provided bosses 63 to receive the interior latch handle 64 and the window winding handle 65.

The inner panel 35 has assembled thereto the various door mechanisms while on the bench, these mechanisms being assembled to the outer surface of the inner panel, that it to say the surface nearest to the outer skin 10 when the door is assembled. After the door mechanisms have been assembled so far as possible on the inner panel the latter is assembled to the outer skin and this is achieved by causing the flanges 41 and 45 to fit within the flanges 12 and 13 on the outer skin and to cause a similar flange 66 on the lower edge of the inner panel to fit within the flange 14 of the outer skin. When the panels are assembled, the apertures 46 in the inner panel are aligned with the pockets 16, the apertures 47 are aligned with the pockets 20 and the apertures 50 are aligned with the pockets 19. The outer skin and inner panel are then releasably interconnected by passing screws or bolts through the apertures to engage the inserts in the pockets.

This arrangement has various advantages which have been referred to above. Thus it will be possible to easily remove the inner panel to obtain access to the door mechanisms for maintenance and replacement purposes. Furthermore, if the door should be damaged it may be possible to replace either the outer skin or the inner panel. For example if the door has been damaged in an accident it may only be necessary to replace the outer skin with or without the reinforcing member.

It will be seen that the inner panel is not provided with any apertures in the panel part 37 except those in the bosses 63 and therefore provides a complete interior closure to the door. The inner surface of the panel part 37 may form the interior trim to the door or a trim panel may be secured to the panel part 37. In the former case a pattern may be formed on the panel part 37 during the moulding procedure. The use of a substantially imperforate panel 37 obviates the need to include a thin sheet of plastic material included in conventional doors to provide a moisture barrier between the interior of the door and the interior of the body. If desired, an arm rest may be moulded onto the inner surface of the panel part 37 or such arm rest may be secured to the panel part 37 before the inner panel 35 is secured to the outer skin 10.

It will be appreciated that before the inner panel 35 is secured to the outer skin 10 the window 60 and window winding mechanism 59 together with all the latch parts will be secured to the inner panel. Moreover, any brightwork required on the upper frame 36 can be assembled thereto and weather stripping may be secured to the inner panel.

It will be appreciated that because substantially all of the door mechanism is assembled to the inner panel before the latter is offered up to and secured to the outer skin the door assembly time on the assembly line will be cut down very substantially.

Referring now to FIG. 7 this shows how a lock may be mounted on the reinforcing member 25 and in particular how it may be assembled onto the flange 28. The lock and latch mechanism is indicated generally at 68 and is adapted to be bolted to the flange 28 with the lock bolt 69 passing through the central aperture 70 in the flange 28. Also bolted to the flange 28 by the same bolts which bolt the lock 68 is a decorative cover 71 and an anti-burst plate 72. The lock 68 has a first operating member 73 which is operable by a cylinder locking device 74 which is mounted on the outer skin and is either incorporated in the external door handle or is mounted separately therefrom. The lock 68 has a second operating member 75 which is operable by a lever 76 connected to the remote control 61 shown in FIG. 4. It will be appreciated that since it is necessary to mount the cylinder locking device 74 on the outer skin 10 after it has been painted it is not possible to mount the lock 68 and the items 71 and 72 on the flange 28 until after the outer skin has been painted and the cylinder locking device mounted thereon.

FIG. 4 shows the the lever 76 is accomodated in guides 77 moulded on the outer surface of the panel part 47. Due to the fact that the lever is mounted between the outer skin and the inner panel it can be so guided as not to rattle relative to the remainder of the door construction and thus it is unnecessary to insert packing pieces of, for example, felt between the lever and other parts of the door as is necessary at present.

Referring now to FIG. 8, this is a section to show how the various parts are interconnected and is taken by way of example through the boss 15. Pressed onto the pocket 16 is an insert 78 which has a knurled outer surface 79 which holds the insert firmly in the pocket 16. The insert has a bore 80 which is internally screw threaded and is engaged by the threaded shank 81 of a bolt or screw 82 which passes through the aperture 47 in the flange 44 of the inner panel, the head 83 of the bolt overlying the flange.

Figure 9:
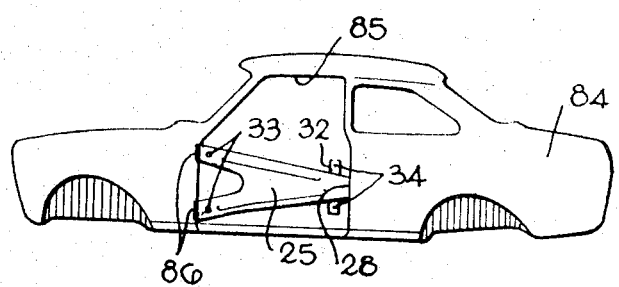
FIG. 9 is a side elevation of a vehicle body shell showing the reinforcing member secured thereto.

In manufacturing a car body using a door of the construction described above the following steps are preferably followed. Referring to FIG. 9, this shows a car body shell 84 having a door aperture 85. A reinforcing member 25 is secured in the door aperture by means of hinges 86 which are connected to the reinforcing member by bolts engaging the weld nuts 29a an described above. The flange 28 of the reinforcing member will align with the location of the latch mechanism on the body shell 84.

The outer skin 10 is then offered up to the reinforcing member 25 and the screws or bolts 33a and 34a are passed through the apertures 33 and 34 in the reinforcing member and engaged with the threaded inserts in the bosses 23 and 24 respectively on the outer skin. Since the apertures 33 and 34 are somewhat oversize, the outer skin can be adjusted in position so that it takes up the correct location within the door aperture 85. The bolts or screws 33a and 34a are then tightened so as rigidly to secure the outerskin to the reinforcing member 25 in the desired position.

The body shell with the outer skin of all the doors attached thereto as described above is now painted so that consistency of paint colour will be obtained on the body shell and the outer skins of the doors since they will both be painted at the same time.

After painting, the inner panels together with the door mechanisms as described above will be secured to the outer skin. The inner panel will carry all the parts shown in FIG. 4 i.e., the window, the window winding mechanism, latch control and upper frame member. As has been described above, all these parts will be assembled to the inner panel on the bench. The inner panel is then secured to the outer panel by screws or bolts such as 82 as described in relation to FIG. 8. If weather stripping is required on the door then this may be applied to the inner panel assembly before it is secured to the outer skin.

In an alternative method of assembly, the reinforcing member 25 may be mounted on the outer skin 10 by means of the bolts or screws 33a and 34a which, however, are not tightened. The assembly of the outer skin and reinforcing member is then secured to the car body shell 84 by means of the hinges 86 and the outer skin adjusted in position as described above so as to take up the desired location in the door opening and then the screws or bolts 33a and 34a are tightened to hold the outer skin in its final position.

It will be seen that the invention provides an improved door construction for a motor vehicle and also an improved method of assembling a motor vehicle body door which will save time on the assembly line. As has been described above, it is preferred that the outer skin and the inner panel be made of fibre reinforced plastics material but other constructions of plastics material may be employed if desired. Moreover, the upper frame can be formed integrally with either the outer skin or inner panel if desired rather than being a separate member which is secured to the inner panel. In a further modification the outer frame could be a separate member secured to the outer skin before the latter is painted and preferably before the latter is mounted on the motor vehicle body.

We claim:

1. A vehicle door comprising an outer skin of plastics material;

first fixing elements projecting from the inner surface of the skin;

an inner panel of plastics material; releasable securing means holding the skin and the panel in assembled relation;

a Y-shaped metal reinforcing member interposed between the panel and the skin extending between the front and rear edges of the door with the end of the stem of the Y providing an anchorage for the door latch mechanism and the ends of the bifurcations of the Y providing anchorages for the door hinges;

and second fixing elements engaging the reinforcing member and the first fixing elements rigidly to secure the reinforcing member to the skin;

the fixing elements and the reinforcing member being arranged to permit of adjustment of the relative positions of the skin and the reinforcing member before the two are rigidly secured together.

2. A vehicle door according to claim 1 wherein said anchorages are exposed and not covered by plastics material so that the hinges and the latch mechanism are connectable directly to the anchorages.

3. A vehicle door according to claim 1 wherein the first fixing elements comprise bosses arranged to receive bolts or screws forming the second fixing elements and oversize holes are provided in the reinforcing member to permit said adjustment of the relative positions of the outer skin and the reinforcing member.

4. A vehicle door according to claim 1 wherein the releasable securing means are arranged around the sides and bottoms of the outer skin and the inner panel.

5. A vehicle door according to claim 1 wherein at least some of the door mechanisms are carried solely by the inner panel.

6. A vehicle door according to claim 1 wherein the upper frame for the door window is carried solely by the inner panel.

7. A method of manufacturing a vehicle body including a body shell and a door as claimed in claim 1 comprising the steps of:
 1. securing hinges to the body shell and to the reinforcing member;
 2. applying the outer skin to the reinforcing member;
 3. adjusting the position of the outer skin relative to the body shell and fixing the outer skin to the reinforcing member in said adjusted position;
 4. simultaneously painting the exterior of the body shell and of said outer skin; and then
 5. securing the inner panel to the outer skin after having mounted the door mechanisms on the inner panel.

8. A method according to claim 7 wherein the reinforcing member is secured to said body shell by means of the hinges before the outer skin is applied to the reinforcing member.

* * * * *